United States Patent [19]
Bekkers

[11] Patent Number: 5,181,878
[45] Date of Patent: Jan. 26, 1993

[54] DEVICE FOR CUTTING LOOSE THE RECTUM OF A SLAUGHTERED ANIMAL CARCASS

[75] Inventor: Marinus F. L. Bekkers, Son en Breugel, Netherlands

[73] Assignee: C.C.M. Beheer B.V., AD Nuenen, Netherlands

[21] Appl. No.: 702,038

[22] Filed: May 20, 1991

[30] Foreign Application Priority Data

May 17, 1990 [NL] Netherlands .................. 9001152

[51] Int. Cl.⁵ .............................................. A22C 21/06
[52] U.S. Cl. ..................................... 452/109; 452/122
[58] Field of Search ............... 452/120, 106, 107, 109, 452/123, 173, 122

[56] References Cited

U.S. PATENT DOCUMENTS

| | | | |
|---|---|---|---|
| 3,634,908 | 1/1972 | Chamberlain | 452/109 |
| 3,975,796 | 8/1976 | LaBarber | 452/109 |
| 4,564,977 | 1/1986 | Scheier et al. | 452/109 |

Primary Examiner—Bruce M. Kisliuk
Assistant Examiner—Lawrence Cruz
Attorney, Agent, or Firm—Fiddler & Levine

[57] ABSTRACT

Device for cutting loose the rectum of the carcass of a slaughtered animal, having a shut-off and positioning element fitted at the end of an elongated carrier with concentrically around it a rotary cutting element, and with means for creating a vacuum around said carrier, said positioning element being provided with a bore open at its front side, into which opens a flusing liquid supply channel.

8 Claims, 2 Drawing Sheets ical axis. Said carrier is supported by means of the bearing 14 in an outer protecting sleeve 16. During use, the shut off and positioning ball 2 is first inserted up to a suitable depth through the anus into the

DEVICE FOR CUTTING LOOSE THE RECTUM OF A SLAUGHTERED ANIMAL CARCASS

BACKGROUND OF THE INVENTION

The invention relates to a device for cutting loose the rectum of the carcass of a slaughtered animal, comprising a shut-off and positioning element to be introduced into the anus, which element is fitted at the end of an elongated carrier and has concentrically around it a rotary cutting element, and with means for creating a vacuum around said carrier.

DESCRIPTION OF THE PRIOR ART

Such a device is known per se from NL-A-8602219 (corresponding to EP-A-0,258,939). This known device has the disadvantage that, due to the vacuum prevailing around the carrier, fat, faeces and other impurities are sucked into and pollute the vacuum system, after some time causing it to become blocked. They also constitute a very undesirable source of cross-contamination.

SUMMARY OF THE INVENTION

The object of the invention is to eliminate this disadvantage, and this object is achieved according to the invention in a simple and effective manner through the fact that the positioning element is provided with a bore open at its front side, a flushing liquid supply channel opening out into this bore.

In a preferred embodiment the carrier comprises a hollow pipe which is to be connected to a vacuum source, and of which the interior extends to the bore in the positioning element, the flushing liquid channel being accommodated in the interior of the pipe.

Said flushing liquid channel preferably provided with an outlet opening which is bevelled along a plane which intersects the central axis of the hole at an acute angle.

DESCRIPTION OF A PREFERRED EMBODIMENT

Figure 1:
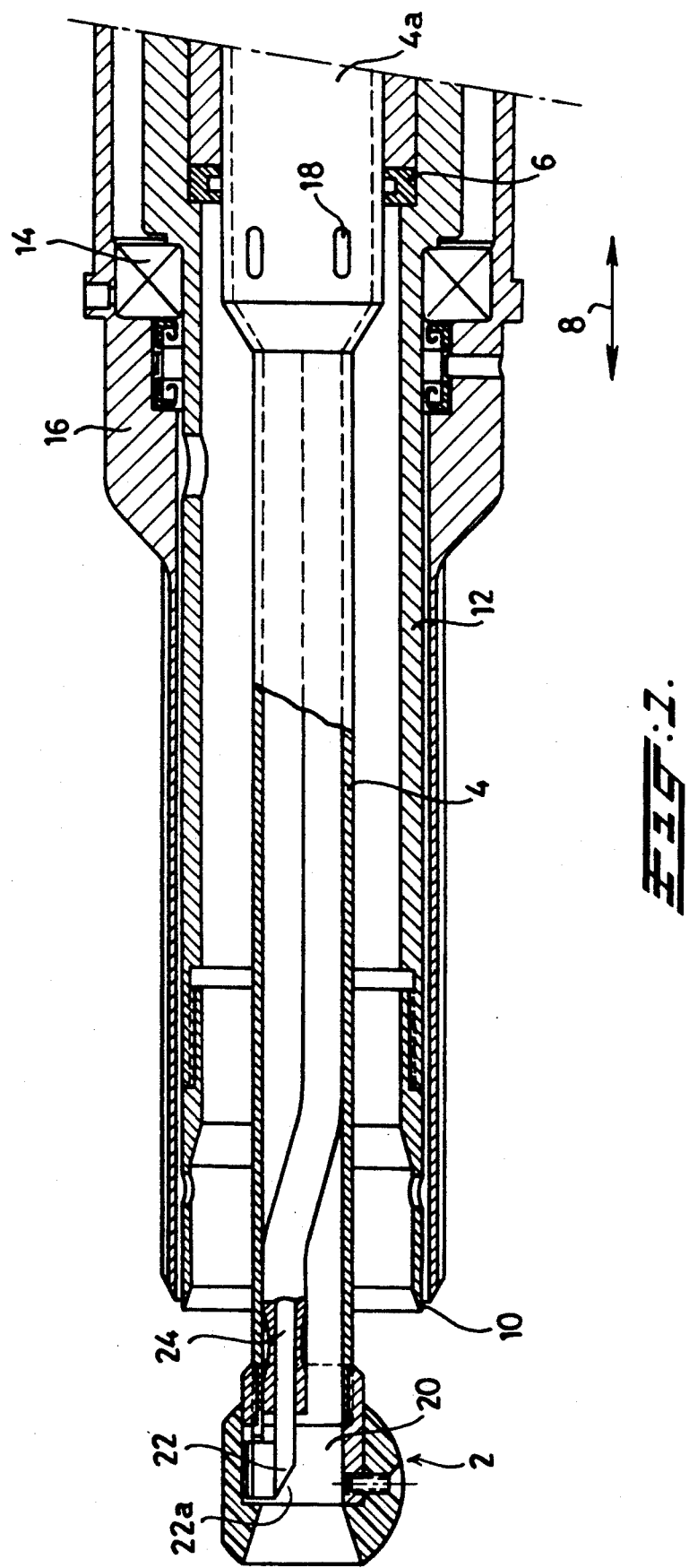
FIG. 1 is a longitudinal section through an embodiment of the device according to the invention.

The device shown in FIG. 1 for cutting loose the rectum of a slaughtered animal by and large corresponds to that which is used in a plant such as that described in NL-A-8602219 (corresponding to EP-A-0,258,939). This device comprises a flattened circular shut off and positioning ball 2 which is fitted on the end of a carrier 4 which is accommodated in suitable guides 6 so that it is movable in the lengthwise direction and can be moved by a drive element (not shown) in the direction of the arrows 8. According to the invention, this carrier is designed as a hollow pipe. Around the front end of the pipe 4 is a cylindrical cutter 10 which is fitted at the end of an also tubular carrier 12, which is coaxial with the pipe 4 and is, driven so that it rotates about the central axis. Said carrier is supported by means of the bearing 14 in an outer protecting sleeve 16. During use, the shut off and positioning ball 2 is first inserted up to a suitable depth through the anus into the rectum. The rotary cutter 10 is then moved forward and the cutting edge thereof cuts away the rectum.

During the operation of this device a vacuum is maintained around the pipe 4 and behind the positioning ball 2; in the embodiment shown this is achieved through the widened continuation 4a of the pipe 4 being connected to a vacuum source and having air suction openings 18 on its cylindrical surface.

The known device of this type has the disadvantage that dirt (faeces and fat) is sucked in through the vacuum pipe, after some time blocking the vacuum system and also being the cause of cross-contamination.

In order to eliminate this disadvantage, according to the invention, the positioning ball 2 is provided with a bore 20 situated in line with the pipe 4, and the outflow opening 22 of a flushing liquid supply pipe 24 opens in this bore. As the figure shows, this flushing liquid supply pipe 24 is positioned in the interior of the pipe 4.

As the figure shows, the outflow opening 22 is bevelled along a plane 22a which intersects the central axis of the pipe 4 at an acute angle.

Figure 2:
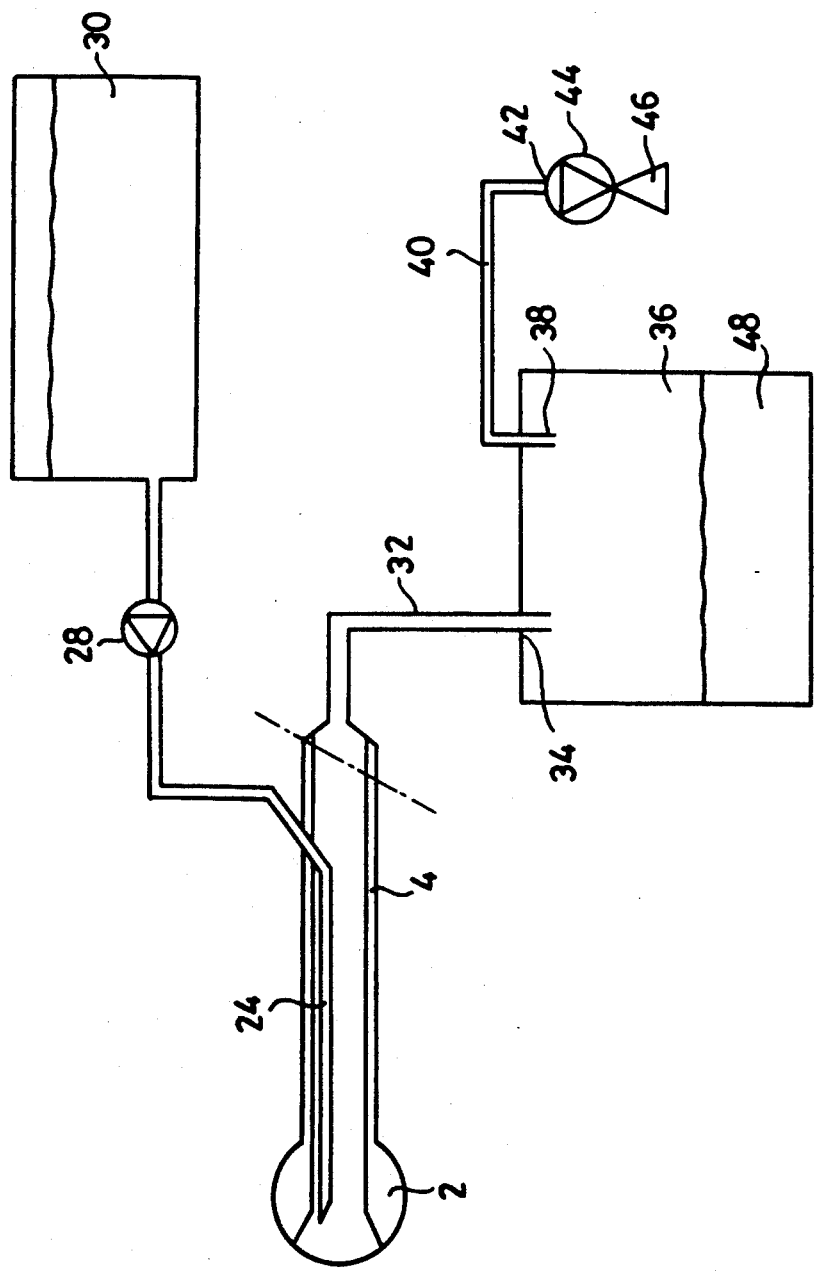
FIG. 2 is a schematic view of the way in which the flushing liquid and vacuum pipe are connected.

As FIG. 2 shows, the pipe 24 is connected by means of a pump 28 to a tank 30 for the flushing liquid, which can be, for example, hot water to which a disinfectant is added if desired. The pipe 4 is connected by means of a pipe 32 extending to a pipe branch 34 which opens into the top side of a settling tank 36. At this top side a second pipe branch 38 is connected by means of the pipe 40 to the suction side 42 of a vacuum pump 44 with inlet 46. The mixture of faeces and liquid supplied through the pipe 32 settles as indicated by 48 in the tank 36.

It has been found in practice that with the measures according to the invention the vacuum system remains free of impurities, while cross-contamination is effectively prevented.

What is claimed is:

1. Device for cutting loose the rectum of the carcass of a slaughtered animal, having a shut-off and positioning element to be introduced into the anus, which element is fitted at the end of an elongated carrier and has concentrically around it a rotary cutting element, and having means for creating a vacuum around said carrier, the shut off and positioning element being provided with a bore open at its front side, and a flushing liquid supply channel opening out into this bore.

2. Device according to claim 1, in which the carrier comprises a hollow pipe which is connected to a vacuum source, and of which the interior extends to the bore in the positioning element.

3. Device according to claim 2, in which the flushing liquid channel is accommodated in the interior of the pipe.

4. Device according to claim 1, in which the flushing liquid supply channel is provided with an outlet opening which is bevelled along a plane which intersects the central axis of the bore at an acute angle.

5. Device according to claim 2, comprising air admission apertures provided in the surface of the pipe.

6. Device according to claim 2, in which the interior of the pipe is connected to a first pipe branch which opens into the top side of a settling tank, into which top side a second pipe branch connected to the suction side of a vacuum pump opens.

7. Device according to claim 1, in which the flushing liquid is hot water.

8. Device according to claim 1, in which a disinfectant is added to the flushing liquid.

* * * * *